United States Patent
Erfanfar

(10) Patent No.: US 7,546,674 B2
(45) Date of Patent: Jun. 16, 2009

(54) METHOD OF ROTOR ASSEMBLY WITHOUT THE HUB

(75) Inventor: Mohsen M. Erfanfar, Carmel, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 445 days.

(21) Appl. No.: 11/263,177

(22) Filed: Oct. 31, 2005

(65) Prior Publication Data

US 2007/0096584 A1    May 3, 2007

(51) Int. Cl.
*H02K 15/04* (2006.01)

(52) U.S. Cl. .......................... 29/598; 310/217; 164/109

(58) Field of Classification Search ........... 29/596–598, 29/732, 609; 310/216, 231, 259, 269; 164/108–110, 164/113

See application file for complete search history.

(56) References Cited

U.S. PATENT DOCUMENTS

| | | | | |
|---|---|---|---|---|
| 996,927 | A * | 7/1911 | Ihlder | 310/65 |
| 2,370,458 | A * | 2/1945 | Goran | 310/211 |
| 3,597,835 | A | 8/1971 | Scaillet et al. | 29/598 |
| 3,778,652 | A * | 12/1973 | Endress | 310/211 |
| 4,499,661 | A | 2/1985 | Peachee, Jr. | 29/598 |
| 4,562,641 | A | 1/1986 | Mosher et al. | 29/598 |
| 4,843,705 | A | 7/1989 | Aussieker et al. | 29/598 |
| 5,010,266 | A * | 4/1991 | Uchida | 310/156.22 |
| 5,704,111 | A * | 1/1998 | Johnson et al. | 29/598 |
| 5,829,120 | A * | 11/1998 | Uchida et al. | 29/598 |
| 5,990,595 | A * | 11/1999 | Crowell | 310/261 |
| 6,122,817 | A * | 9/2000 | Meacham et al. | 29/598 |
| 6,417,596 | B1 | 7/2002 | Schurter et al. | 310/261 |
| 6,499,209 | B1 * | 12/2002 | Landin et al. | 29/596 |
| 6,515,395 | B1 * | 2/2003 | Jansen | 310/211 |
| 6,700,288 | B2 * | 3/2004 | Smith | 310/218 |
| 6,848,495 | B2 * | 2/2005 | Edwards et al. | 164/109 |
| 7,302,754 | B2 * | 12/2007 | Majernik et al. | 29/729 |
| 7,345,396 | B2 * | 3/2008 | Cervenka et al. | 310/216 |

* cited by examiner

*Primary Examiner*—Minh Trinh

(57) ABSTRACT

A method of assembling a rotor assembly is provided, without the use of a rotor steel hub. The method comprises forming first, second and third lamination stacks by stacking individual rotor laminations together. The first, second and third lamination stacks are cast to lock the individual rotor laminations together. The rotor laminations in the first, second and third lamination stacks have a generally ring-like shape with a variable inner diameter and a substantially common outer diameter. The rotor laminations in the first, second and third lamination stacks have substantially the same outer diameter, whereas the rotor laminations in the second lamination stack have a substantially larger inner diameter than the first and third rotor laminations. The elimination of the hub results in reducing total cost and manufacturing cycle time, and in improved features, performance and efficiency of the rotor assembly.

12 Claims, 2 Drawing Sheets

METHOD OF ROTOR ASSEMBLY WITHOUT THE HUB

TECHNICAL FIELD

This invention relates to a structure and method of assembling a rotor assembly, without the use of a rotor steel hub.

BACKGROUND OF THE INVENTION

Conventional electric motors generally comprise of a cylindrical stator and a rotor assembly located within the stator. Typically, the rotor assembly is constructed with the aid of a heavy steel hub. The hub is used to ensure that the rotor laminations are connected to external structures and support the structure of the rotor assembly. The use of a hub requires special machining for locking rotor components or tabs to the hub. In the use of a hub to assemble the rotor assembly, the rotor components or tabs must be perfectly aligned to complete the assembly process.

In order for the hub to slide over the rotor lamination stack, a gap must be created. The hub is ordinarily contracted with the use of liquid nitrogen at −300° F. while the rotor laminations are expanded with the use of an oven at 400° F. As the temperatures normalize, the gap dissipates and a "shrink-fit" between the hub and rotor laminations results.

Other typical rotor assemblies include a supporting rotor shaft extending through a central hole in the stack of rotor laminations. The rotor shaft may also be welded onto either end of the stack of rotor laminations.

SUMMARY OF THE INVENTION

The present invention eliminates the use of a hub in assembling the rotor assembly. There is no supporting rotor shaft extending through the center of the stack of rotor laminations or attached at the ends of the stack of rotor laminations.

A structure and method of assembling a rotor assembly is provided. The first step comprises forming a first lamination stack by stacking individual first rotor laminations. The first lamination stack has a first end and a second end. The second step comprises stacking individual second rotor laminations onto the second end of the first lamination stack, thereby creating a second lamination stack. The second lamination stack has a first end and a second end. The third step comprises stacking a set of third rotor laminations onto the second end of the second lamination stack thereby creating a third lamination stack. The third lamination stack has a first end and a second end.

In another aspect of the invention, the first, second and third lamination stacks are cast to lock the first, second and third rotor laminations together. The first, second and third rotor laminations have a generally ring-like shape with a variable inner diameter and a substantially common outer diameter. The first, second and third rotor laminations have substantially the same outer diameter, whereas the second rotor laminations have a substantially larger inner diameter than the first and third rotor laminations.

The elimination of the hub results in the elimination of the use of liquid nitrogen at −300° F. and oven at 400° F. in the "shrink-fit" process described above. Fewer parts are needed with the method of this invention than are typically required, resulting in less inventory problems. The cost of assembling the rotor is reduced as is the time required to manufacture and assemble the rotor.

The above method also leads to improved rotor heat transfer for improved rotor oil cooling. As a result of the elimination of the rotor hub, the oil contained within the rotor has better contact with the rotor laminations, leading to better heat transfer. A cooler motor draws less electric current to operate, thereby reducing electric power consumption. The improved method also leads to better concentricity between the outer and inner diameters of the rotor. The gap between the outer diameter of the rotor and stator inner diameter will be more uniform and consistent since the flange bearing journals on both ends are more concentric.

The above features and other features and advantages of the present invention are readily apparent from the following detailed description of the best modes for carrying out the invention when taken in connection with the accompanying drawings.

DESCRIPTION OF THE PREFERRED EMBODIMENTS

In the embodiment described below, the rotor assembly is used in an electric motor in a hybrid transmission for a vehicle. However the method and structure described below is suitable for use with rotors for induction machines, permanent magnet and switch reluctance machines as well as other suitable machines.

Figure 1:
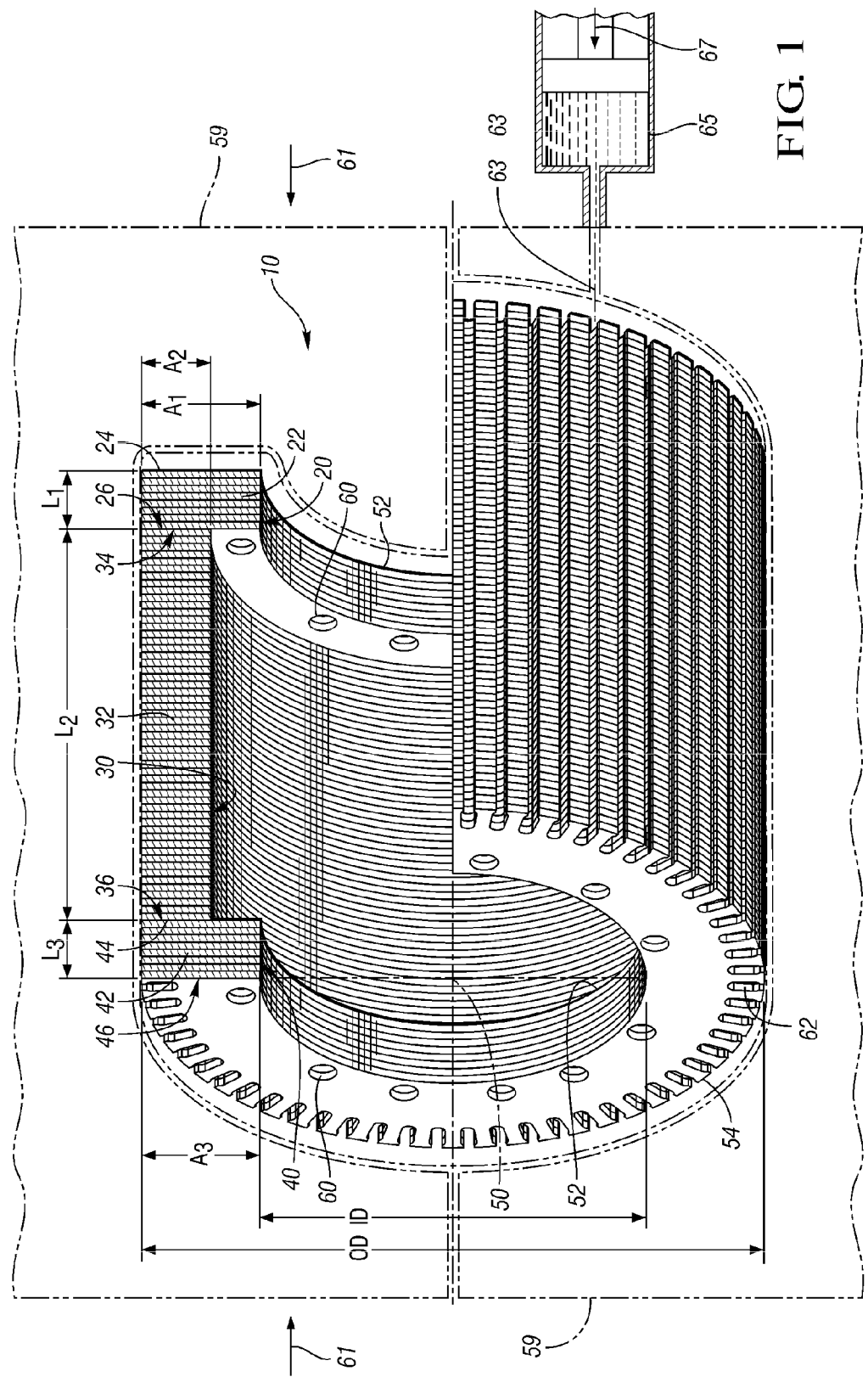
FIG. 1 is a fragmentary schematic perspective view of the rotor assembly, with a casting mold shown in phantom.
Figure 2:
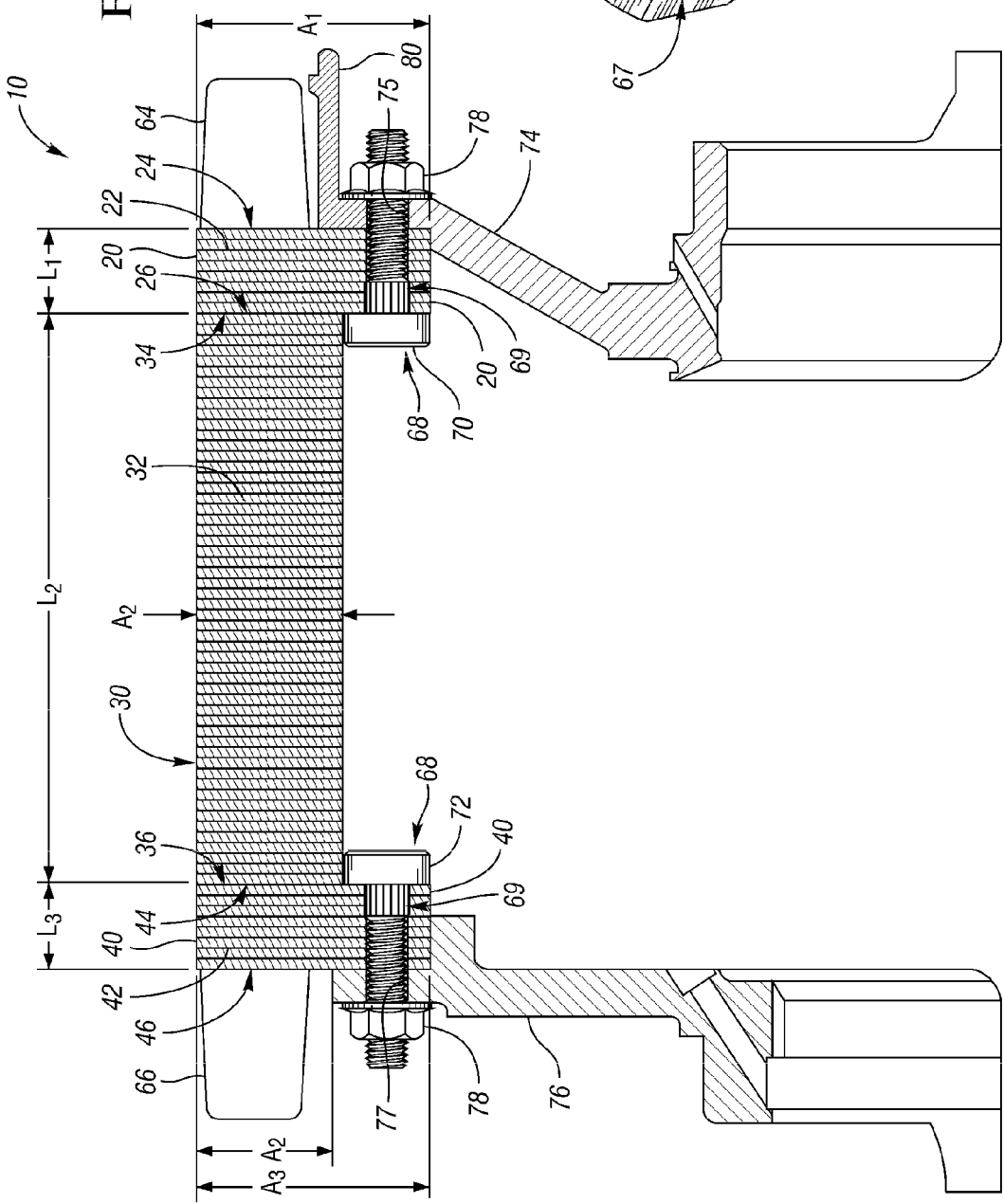
FIG. 2 is a fragmentary schematic cross sectional view of the rotor assembly.

Referring to FIG. 1, a perspective view of part of a rotor assembly 10 is illustrated. FIG. 2 is a schematic cross sectional view of part of the rotor assembly 10. The rotor assembly comprises a first lamination stack 20, second lamination stack 30 and a third lamination stack 40. The first lamination stack 20 is made up of individual first rotor laminations 22. The first lamination stack 20 has a first end 24 and a second end 26. The rotor assembly 10 also comprises a second lamination stack 30, attached to the second end 26 of the first lamination stack 20. The second lamination stack 30 is made up of individual second rotor laminations 32. The second lamination stack 30 has a first end 34 and a second end 36. The rotor assembly 10 also comprises a third lamination stack 40, attached to the second end 36 of the second lamination stack 30. The third lamination stack 40 is made up of individual third rotor laminations 42. The third lamination stack 40 has a first end 44 and a second end 46. The first lamination stack 20 and the third lamination stack 40 are substantially identical in size, see discussion below.

The first, second and third rotor laminations 22, 32 and 42 respectively are generally circular disks which are made of flat sheets of silicone steel. The sheets, which may be made of other suitable materials, are fitted into a punching die (not shown) which punches holes into the sheet resulting in a generally ring-like shape. Other non-circular shapes that are suitable for use in various electric machine rotor assemblies may also be employed.

As shown in FIG. 1, the first, second and third rotor laminations 22, 32 and 42 have an opening with center 50, an inner circumference 52 and an outer circumference 54. The distance between two points on the outer circumference 54, going through the center 50 of the opening represents the outer diameter OD of each rotor lamination, as shown in FIG. 1. The distance between two points on the inner circumference 52, going through the center 50 of the opening represents the inner diameter ID of each rotor lamination, as shown in FIG. 1. Each of the first, second and third rotor laminations 22, 32, 42 have annulus regions $A_1$, $A_2$ and $A_3$, respectively, between their respective inner and outer circumferences 52 and 54.

In the embodiment shown, the first, second and third rotor laminations 22, 32 and 42 are stacked in an axial direction. The first lamination stack 20 has an axial length $L_1$. The second lamination stack 30 has an axial length $L_2$. The third lamination stack 40 has an axial length $L_3$. There are approximately 25 first rotor laminations 22 in the first lamination stack 20. There are approximately 220 second rotor laminations 32 in the second lamination stack 30. There are approximately 25 third rotor laminations 42 in the third lamination stack 40. Thus, in the preferred embodiment, the second lamination stack 30 has an axial length $L_2$ greater than either of the first and third lamination stacks 20 and 40, i.e. the second lamination stack 30 contains a greater number of individual rotor laminations than either of the first and third lamination stacks 20 and 40 or the laminations of the combined laminations of the first and third lamination stacks 20 and 40. Existing automated lamination feeding and stacking machines can be utilized for this assembly process.

In terms of the sizes of the individual rotor laminations, the first, second and third rotor laminations 22, 32 and 42 have substantially the same outer diameter OD. However the first and third rotor laminations 20 and 40 have substantially smaller inner diameters ID than the second rotor laminations 30, as shown in FIGS. 1 and 2, to allow for the placement of bolt holes 60. Thus the annulus region $A_1$ and $A_3$ is larger for the first and third rotor laminations 20 and 40 than the annulus region $A_2$ of the second rotor lamination 30.

As shown in FIG. 1, slots 62 extend along the periphery of the outer circumference 54 of the first, second and third rotor laminations 22, 32 and 42. The first, second and third lamination stacks 20, 30 and 40 are cast together by first being placed in a die cast mold fixture or casting mold 59 (shown in phantom in FIG. 1). The first, second and third lamination stacks 20, 30 and 40 are molded by applying pressure (compression may be shown by arrows 61) to lock the first, second and third lamination stacks 20, 30 and 40 together.

Molten aluminum 63 or other suitable material is injected, as shown at 65 in FIG. 1, into the slots 62. The molten aluminum 63 flows through the slots 62 from the first end 24 of the first lamination stack 20 to the second end 46 of the third lamination stack 40. A means of pressure such as hydraulic back pressure (shown by arrow 67) is applied against the molten aluminum 63 forcing the molten aluminum 63 into the slots 62 to lock the first, second and third rotor laminations 22, 32 and 42 together in a unitary configuration, thereby avoiding air gaps, porosity and bubbles. For example, the first, second and third lamination stacks 20, 30 and 40 may be compressed together in a die-casting machine or casting mold 59 (shown in phantom in FIG. 1) so as to lock the first, second and third rotor laminations 22, 32 and 42 together. The molten aluminum 63 solidifies to create a first end ring 64 at the first end 24 of the first lamination stack 20 and a second end ring 66 at the second end 46 of the third lamination stack 40, see FIG. 2. The aluminum or other suitable material first and second end rings 64 and 66 serve to enhance the conductivity of the rotor assembly 10.

As shown in FIGS. 1 and 2, bolt holes 60 extend along the periphery of the inner circumference 52 of the first and third rotor laminations 22 and 42. The bolt holes 60 are configured to receive a corresponding bolt 68.

Figure 3:
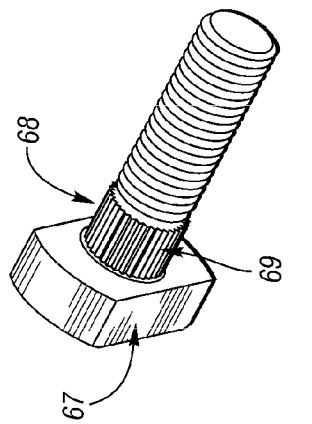
FIG. 3 is a schematic perspective view of the bolt used in the present invention.

FIG. 3 is a schematic perspective view of a bolt 68. The head of each bolt 68 has a flat side 67 that may be used to wedge and lock the bolt 68 in the first and third lamination stacks 20 and 40. Each bolt 68 has serrations 69 that prevent the bolt 68 from rotating and interact with complementary slots on the inside of each bolt hole 60. The flat side 67 of the head of the bolt 68 and the serrations 69 provide anti-rotation when the first and second flange 74 and 76 (see discussion below) is assembled and the nut 78 is tightened. There are twelve bolt holes 60 in the preferred embodiment, however any number of bolt holes may be used. A representative first bolt 70 and representative second bolt 72 is shown in FIG. 2, attached onto the first lamination stack 20 and the third lamination stack 40, respectively.

A first flange 74 is attached onto the first end 24 of the first lamination stack 20, using the first bolt 70 for orientation. The first bolt 70 goes through a first flange hole 75 in the first flange 74. A second flange 76 is attached onto the second end 46 of the third lamination stack 40, using the second bolt 72 for orientation. The second bolt 72 goes through a second flange hole 77 in the second flange 76. As stated above, the preferred embodiment describes a rotor assembly 10 used in an electric motor (not shown) in a hybrid transmission. The first and second flanges 74 and 76 are mechanical devices that provide a means of attachment for the first, second and third lamination stacks 20, 30 and 40 to the gears and/or other parts of the electric motor in the transmission. The first and second flanges 74 and 76 help transmit power to the mechanical components of the electric motor. A set of nuts 78 are placed over the edges of the first and second bolts 70 and 72 for secure attachment of flange to rotor assembly.

Alternatively, a single flange with multiple holes to mate with respective first and second bolts 70 or 72 may be used. Any number of multiple flanges may also be used. The flange may be constructed of steel or other suitable materials. The physical structure or configuration of the flange may be varied depending on the layout and design of the components to be attached to the rotor laminations 22, 32 and 42 through the flange.

Method

A method for assembling the rotor assembly 10 described above is provided. The first step comprises forming a first lamination stack 20 by stacking individual first rotor laminations 22. The first lamination stack 20 has a first end 24 and a second end 26. The second step comprises stacking individual second rotor laminations 32 onto the second end 26 of the first lamination stack 20 thereby creating a second lamination stack 30. The second lamination stack 30 has a first end 34 and a second end 36. The third step comprises stacking a set of third rotor laminations 42 onto the second end 36 of the second lamination stack 30 thereby creating a third lamination stack 40. The third lamination stack 40 has a first end 44 and a second end 46.

The first, second and third lamination stacks 20, 30 and 40 may be cast together in a die cast mold fixture or casting mold 59 (shown in phantom in FIG. 1) and molded to lock the first, second and third rotor laminations 22, 32 and 42 together. A dowel pin or a guide bar (not shown) may be used to ensure the proper alignment of the first, second and third lamination stacks 20, 30 and 40. The guide bar may be used to align the stacking of the first, second and third lamination stacks in the casting mold 59 prior to molding. The dowel pin or guide bar may be inserted into a respective one or more slots 62 of the rotor lamination 42 and extend axially through the slot to the first end 24 of the first lamination stack 20 or from the first end 24 to the second end 46.

A first bolt 70 may be attached onto the first lamination stack 20 as well as a second bolt 72 onto the third lamination stack 40. A first flange 74 may be attached onto the first end 24 of the first lamination stack 20, using the first bolt 70 for orientation; and a second flange 76 may be attached onto the second end 46 of the third lamination stack 40, using the second bolt 72 for orientation.

Other Steps

A further step may comprise machining the outer circumference 54 of the first, second and third rotor laminations 22, 32 and 42. Machining involves grinding the outer circumference 54 for smoothness and precision of dimensions. This process may be done at the final rotor assembly, which involves assembling both flanges.

A further step may involve fine-tuning a speed sensor wheel 80. Certain rotor assemblies may contain a speed sensor wheel 80, as shown in FIG. 2. The speed sensor wheel 80 may be an integral part of the flange structure or it may be mounted separately by welding, using bolts or other means. If mounted on the structure, the speed sensor wheel 80 must be attached securely so it does not vibrate.

Finally, a next step may be final balancing of the rotor assembly 10, which involves removing and adding extremely small amounts of weight at either end of the rotor assembly 10. This serves to balance the weight of the rotor assembly 10 from one end to the other, leading to reduced vibration and noise.

The thickness of the hub used typically in constructing a rotor restricts the width $A_2$ of rotor laminations to what can be fitted within the hub. Eliminating the hub allows for the cross-sectional area of the rotor laminations to be increased. This allows for a greater electromagnetic flux path and increased efficiency of the motor. Furthermore, the electric motor performance and efficiency is improved as a result of the elimination of the contact pressure applied by the hub on the rotor laminations.

While the best modes for carrying out the invention have been described in detail, those familiar with the art to which this invention relates will recognize various alternative designs and embodiments for practicing the invention within the scope of the appended claims.

The invention claimed is:

1. A method of rotor assembly without a hub comprising:
stacking first rotor laminations sufficiently to form a first lamination stack having an inner diameter of substantially one predetermined size, said first lamination stack having a first end and a second end;
stacking second rotor laminations sufficiently onto said second end of said first lamination stack to form a second lamination stack having an inner diameter of substantially another predetermined size to facilitate the attachment of the rotor assembly without a hub, said second lamination stack having a first end and a second end;
wherein there is no central shaft extending through a center of said rotor assembly to aid construction of the rotor assembly;
stacking third rotor laminations sufficiently onto said second end of said second lamination stack to form a third lamination stack having an inner diameter of said one predetermined size;
wherein said first, second and third rotor laminations have a shape with substantially the same outer diameter; and
wherein said second rotor laminations have a larger inner diameter than said first and third rotor laminations.

2. The method of claim 1 including placing said first and second and third lamination stacks into a casting mold; and compressing said lamination stacks.

3. The method of claim 1, wherein said shape of said first, second and third rotor laminations is a ring shape, having an outer and inner circumference.

4. The method of claim 3, wherein slots extend along a periphery of said outer circumference of said first, second and third rotor laminations.

5. The method of claim 4, further comprising:
injecting molten metal into said slots extending along said periphery of said outer circumference of said first, second and third rotor laminations, wherein said molten metal is injected from said first end of said first lamination stack to said second end of said third lamination stack; and
applying hydraulic back pressure against said molten metal to avoid air gaps, bubbles or porosity inside said first, second and third lamination stacks.

6. The method of claim 5:
wherein said molten metal solidifies at said first end of said first lamination stack to create a first metal end ring; and
wherein said molten metal through said slots solidifies at said second end of said third lamination stack to create a second metal end ring on an opposite end of said assembly.

7. A method of rotor assembly without a hub comprising:
stacking first rotor laminations sufficiently to form a first lamination stack having an inner diameter of substantially one predetermined size, said first lamination stack having a first end and a second end;
stacking second rotor laminations sufficiently onto said second end of said first lamination stack to form a second lamination stack having an inner diameter of substantially another predetermined size to facilitate the attachment of the rotor assembly without a hub, said second lamination stack having a first end and a second end;
stacking third rotor laminations sufficiently onto said second end of said second lamination stack to form a third lamination stack having an inner diameter of said one predetermined size, said third lamination stack having a first end and a second end;
wherein there is no central shaft extending through a center of said rotor assembly to aid construction of the rotor assembly;
wherein said first, second and third rotor laminations have a shape with substantially the same outer diameter;
wherein said second rotor laminations have a larger inner diameter than said first and third rotor laminations;
wherein said shape of said first, second and third rotor laminations is a ring shape, having an outer and inner circumference;
forming a first bolt hole along a periphery of said inner circumference of said first rotor laminations, said first bolt hole extending from said first end of said first lamination stack to said second end of said first lamination stack;
forming a second bolt hole along a periphery of said inner circumference of said third rotor laminations, said second bolt hole extending from said first end of said third lamination stack to said second end of said third lamination stack; and
wherein no bolt holes are formed through said second rotor laminations.

8. The method of claim 7, further comprising:
attaching a first bolt through said first lamination stack through said first bolt hole, said first bolt including first serrations configured to engage with complementary serrations inside said first bolt hole; and attaching a second bolt through said third lamination stack through said second bolt hole, said second bolt including second serrations configured to engage with complementary serrations inside said second bolt hole.

9. The method of claim 8, wherein:

said first bolt includes a flat side positioned at said second end of said first lamination stack to lock said first bolt in said first lamination stack; and said second bolt includes a flat side positioned at said first end of said third lamination stack to lock said second bolt in said third lamination stack.

10. The method of claim 8, further comprising:

attaching a first flange onto said first end of said first lamination stack, said first bolt going through a first flange hole formed in said first flange to orient said first flange;

attaching a second flange onto said second end of said third lamination stack, said second bolt going through a second flange hole formed in said second flange to orient said second flange; and wherein said first and said second flange transmit power from said rotor assembly.

11. The method of claim 8, further comprising:

placing said first and second and third lamination stacks into a casting mold;

compressing said lamination stacks sufficiently to lock all laminations together;

injecting molten metal into slots extending along a periphery of said outer circumference of said first, second and third rotor laminations, wherein said molten metal is injected from said first end of said first lamination stack to said second end of said third lamination stack; and applying hydraulic back pressure against said molten metal to avoid air gaps, bubbles or porosity inside said first, second and third lamination stacks.

12. The method of claim 11, wherein:

said molten metal solidifies at said first end of said first lamination stack to create a first metal end ring; and said molten metal through said slots solidifies at said second end of said third lamination stack to create a second metal end ring on an opposite end of said assembly.

* * * * *